Feb. 18, 1936.  F. KETCHAM ET AL  2,031,417
ROLLER BEARING ASSEMBLING MACHINE
Filed March 30, 1933   5 Sheets-Sheet 1
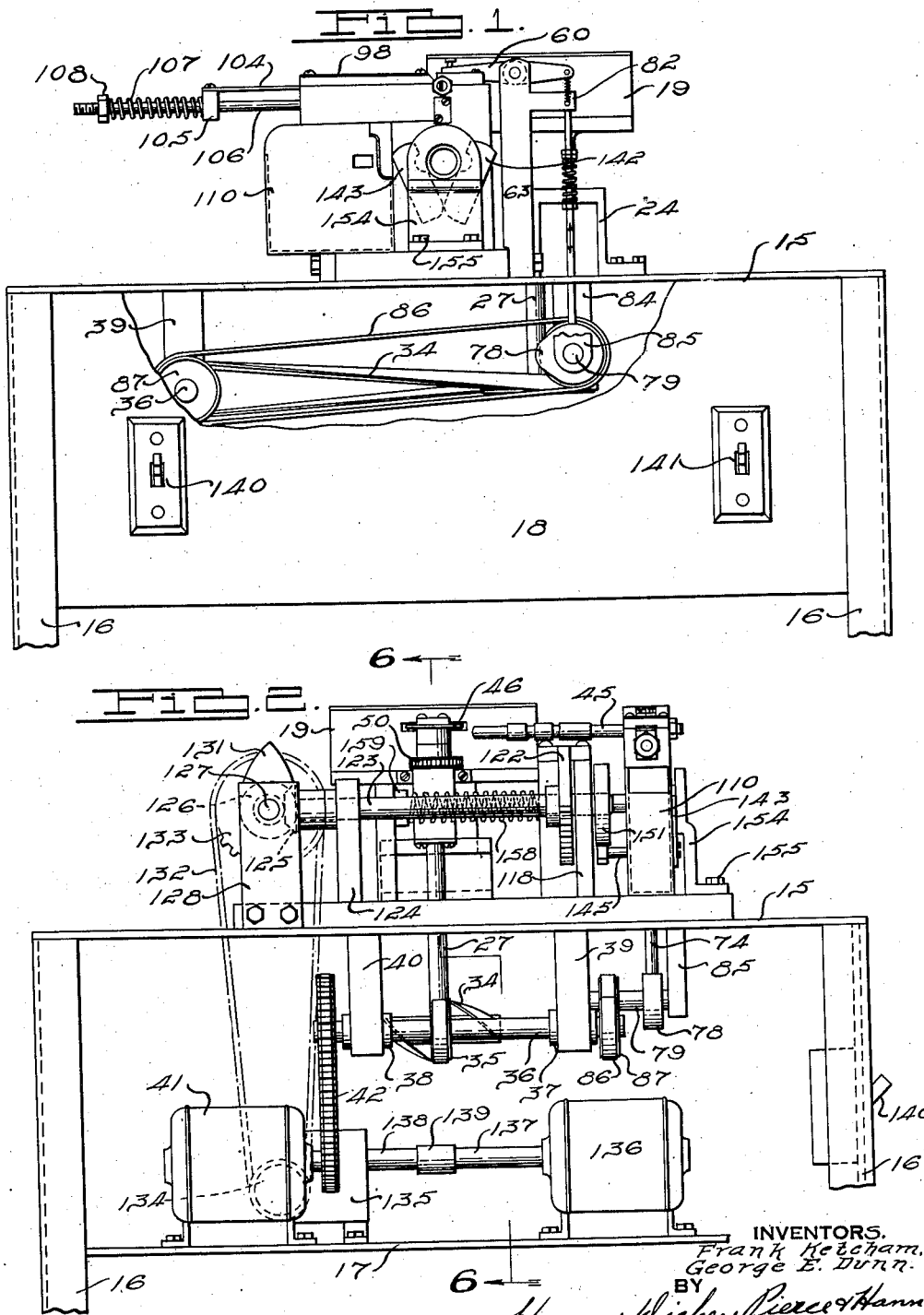
INVENTORS.
Frank Ketcham,
George E. Dunn.
BY
Harness, Dickey, Pierce & Hann.
ATTORNEYS.

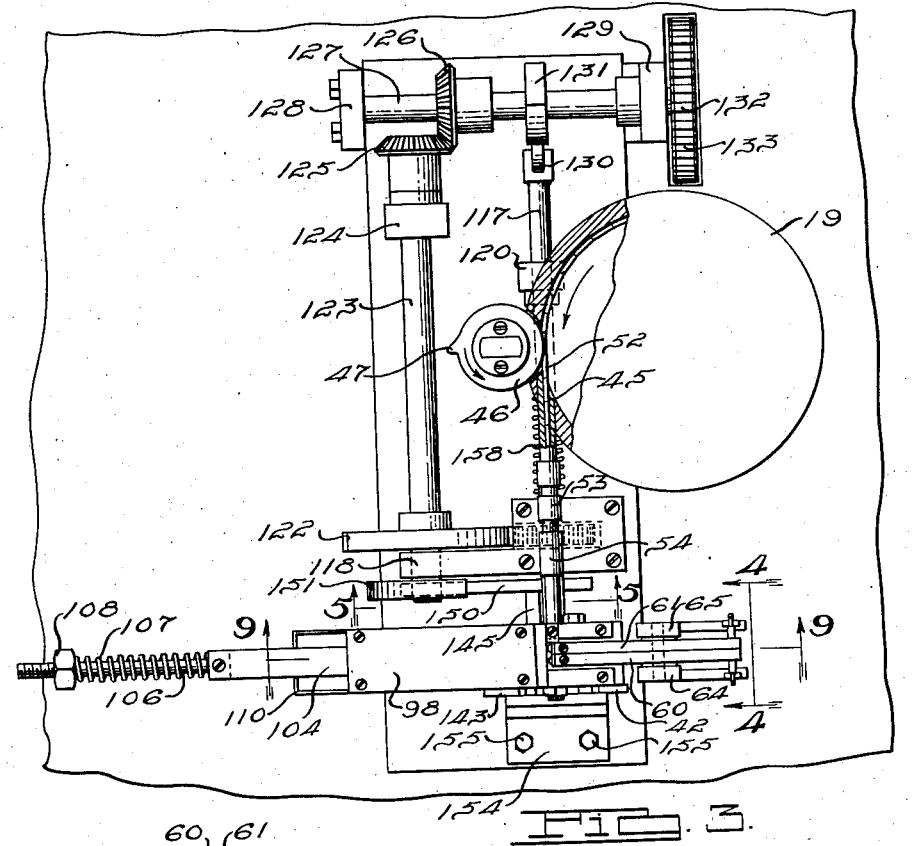
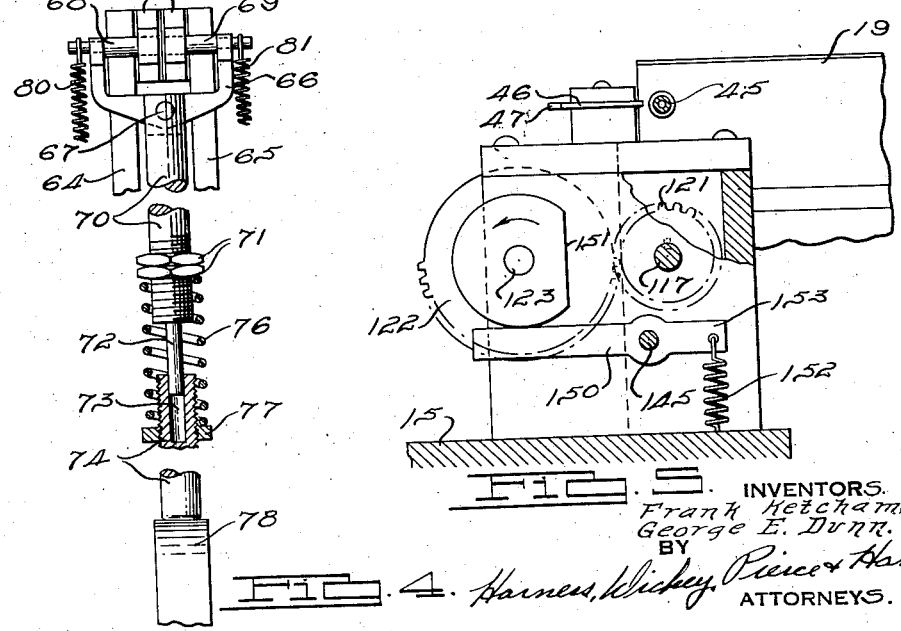

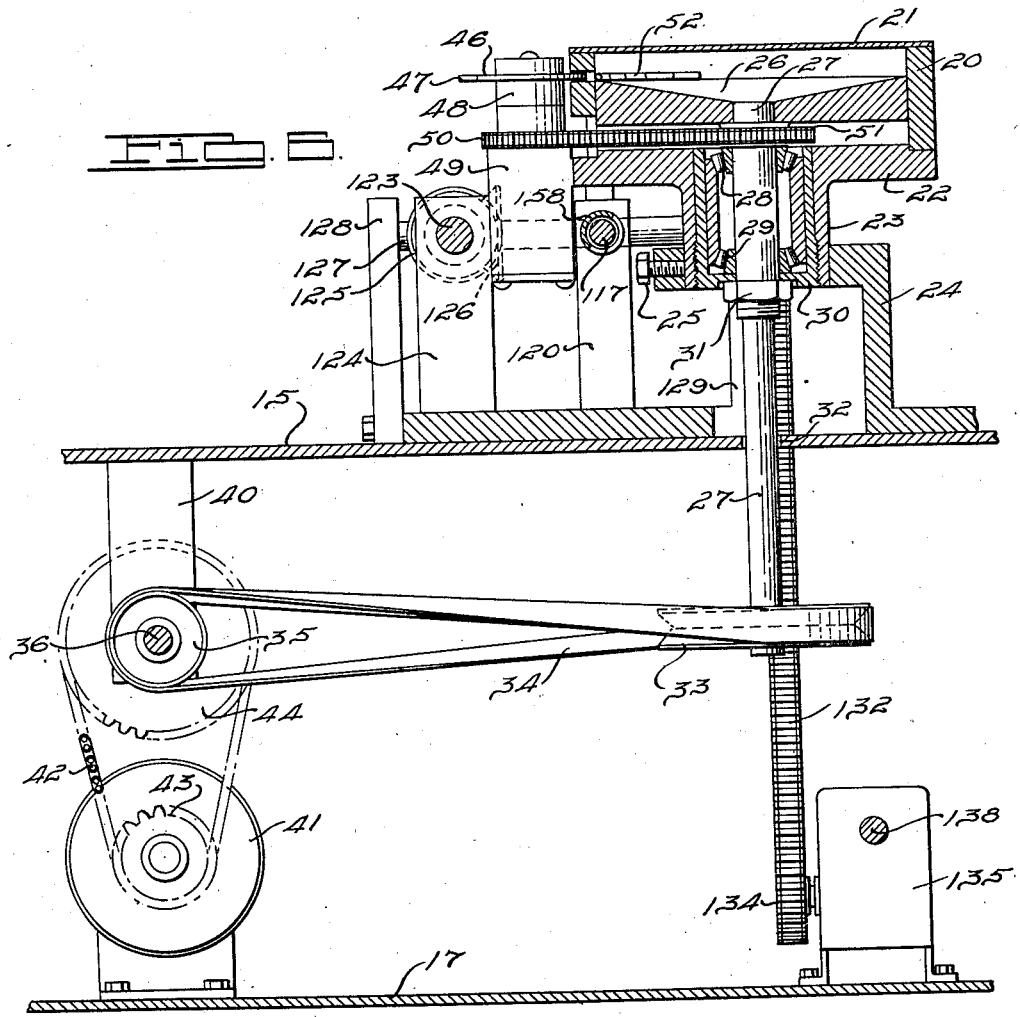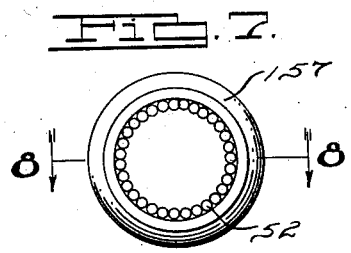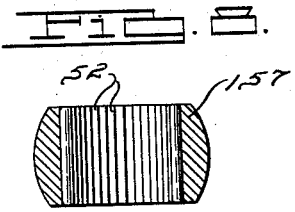

Feb. 18, 1936.  F. KETCHAM ET AL  2,031,417
ROLLER BEARING ASSEMBLING MACHINE
Filed March 30, 1933  5 Sheets-Sheet 4
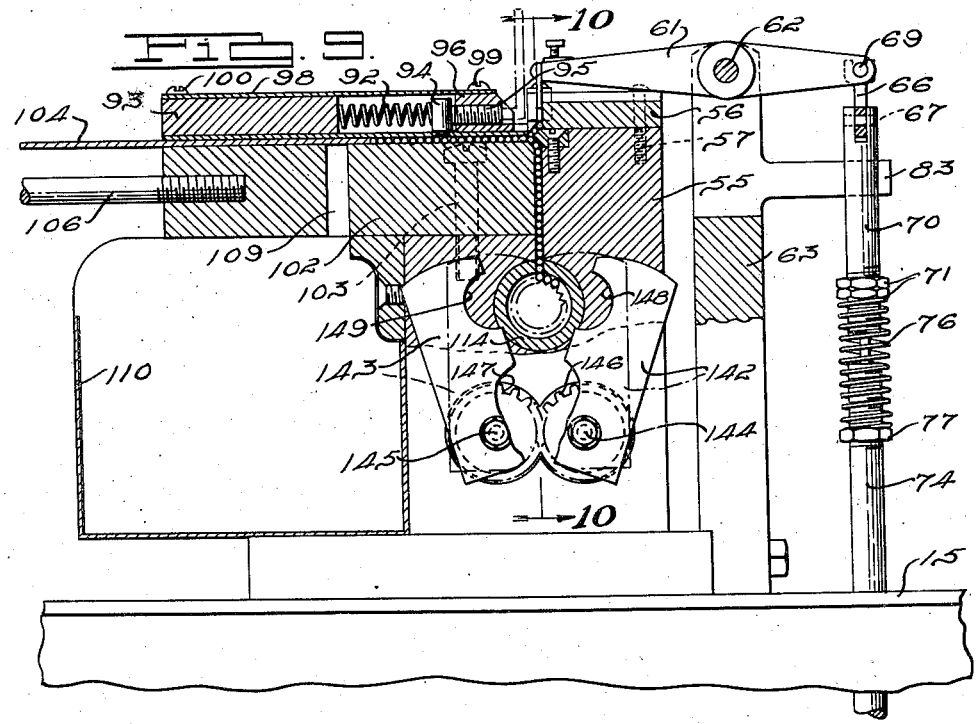
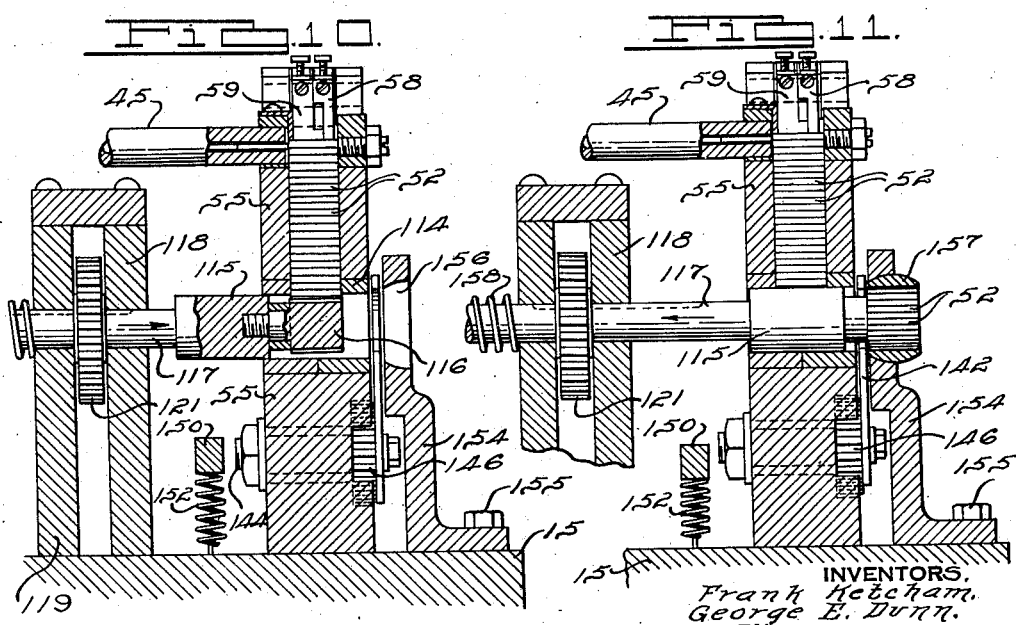
INVENTORS.
Frank Ketcham.
George E. Dunn.
BY
Harness, Dickey, Pierce & Hann.
ATTORNEYS.

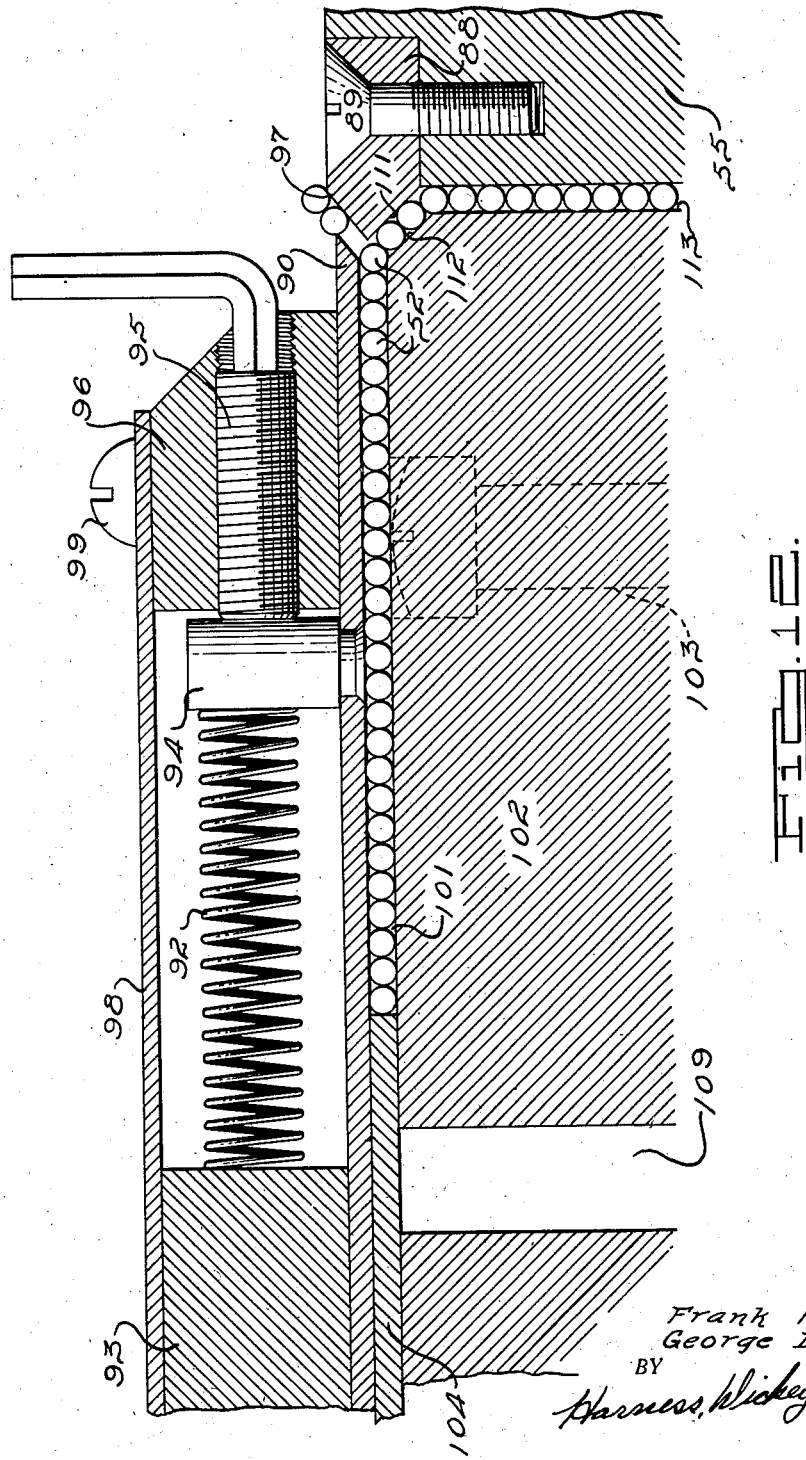

Patented Feb. 18, 1936

2,031,417

UNITED STATES PATENT OFFICE 2,031,417

ROLLER BEARING ASSEMBLING MACHINE

Frank Ketcham, Dearborn, and George E. Dunn, Detroit, Mich., assignors to The Universal Products Co., Inc., a corporation of Delaware Application March 30, 1933, Serial No. 663,444

17 Claims. (Cl. 29—84)

The main objects of this invention are to provide a machine which will assemble a plurality of rollers in predetermined grouped positions; to provide a machine which will separate rollers singly from a loose quantity and position the individual rollers in predetermined grouped position; to provide a roller assembling machine which is adapted to quantity production of roller bearing units, and to provide a roller bearing assembling machine of simple and compact character which is free from intricate and delicate parts so that a minimum of trouble will be experienced in its operation.

An illustrative embodiment of this invention is shown in the accompanying drawings, in which:

Figure 1 is a view in front elevation of the improved machine, a portion of the front panel thereof being broken away to show the interior construction.

Fig. 2 is a view in side elevation of the same.

Fig. 3 is a fragmentary view in top plan of the same with a part of the hopper and discharge conduit thereof shown in horizontal section.

Fig. 4 is an enlarged fragmentary view, partly in elevation and partly in section, taken on the line 4—4 of Fig. 3, looking in the direction indicated.

Fig. 5 is an enlarged fragmentary view, partly in section and partly in elevation, taken on the line 5—5 of Fig. 3, looking in the direction indicated;

Fig. 6 is an enlarged sectional view taken on the line 6—6 of Fig. 2, looking in the direction indicated.

Fig. 7 is a view in face elevation of an outer bearing member with a series of rollers disposed about the inner periphery thereof.

Fig. 8 is a sectional view taken on the line 8—8 of Fig. 7.

Fig. 9 is an enlarged sectional view taken on the line 9—9 of Fig. 3, looking in the direction indicated.

Fig. 10 is a sectional view taken on the line 10—10 of Fig. 9 with the axially movable roller assembling mandrel shown in position for having the rollers assembled therearound.

Fig. 11 is a similar view, but with the mandrel moved to the position to insert the assembled rollers into a bearing member, such bearing member being shown in position.

Fig. 12 is an enlarged vertical sectional view, showing the roller magazine and surrounding parts.

In the construction shown in the drawings, the improved machine is assembled on a table or frame comprising a horizontally disposed top plate 15 of substantially rectangular shape, supported by depending legs 16 disposed at the four corners thereof. A horizontally disposed shelf 17 is secured to the legs 16 in spaced relation, below the top 15 upon which the motor drive units are mounted, and a vertically disposed front panel 18 closes the space between the top 15 and shelf 17 at the front side of the machine.

The improved roller bearing assembling machine comprises a shallow annular hopper, generally designated as 19 in Fig. 1, which is formed by a vertically disposed stationary annular rim 20, a cover plate 21, and a stationary base member 22. The base 22 is provided with a depending tubular neck 23, the lower end of which is securely held in a mounting bracket 24 by a set screw 25. The hopper is provided with a rotatable bottom 26 mounted at the top end of a vertically disposed shaft 27 which is journaled in opposed taper roller bearings 28 and 29, which are assembled in a cup-shaped member 30. The lower or base end of the cup 30 is exteriorly threaded for engaging complementary threads formed on the interior of the neck 23 at the lower end thereof. A nut 31 is threaded on the shaft 27 immediately below the cup 30 for adjusting and retaining the opposed taper roller bearings 28 and 29 with their respective bearing raceways.

The shaft 27 is of reduced diameter immediately below the threaded portion which receives the nut 31 and extends downwardly through an opening 32 formed in the top 15 and the lower end thereof carries a horizontally disposed belt pulley 33 rigidly affixed thereto for receiving a V-shaped drive belt 34. The drive belt 34 is given a quarter turn to pass over and be driven by a vertically positioned belt pulley 35 which is rigidly affixed to a horizontally disposed counter-shaft 36. The countershaft 36 is journaled in bearings 37 and 38 carried at the lower end of depending brackets 39 and 40 respectively which are rigidly secured to the underside of the top member 15.

Rotation is imparted to the counter-shaft 36 by an electric motor 41 mounted on the shelf 17, the drive of which is imparted through a chain 42 and sprocket wheels 43 and 44 mounted on the motor armature shaft and countershaft 36, respectively.

The side wall 20 of the hopper, at a point closely adjacent to the top surface of the revolving bottom 26, is provided with a tangentially disposed opening for receiving one end of a roller discharge conduit 45. Means are provided immediately in front of the opening for controlling the flow of rollers into the discharge conduit 45, which comprises a horizontally rotatable disc 46 having a finger or lug 47 thereon which protrudes into the pathway of the rollers being fed to the discharge conduit, the disc 46 being positioned in a horizontally disposed slot formed in the hopper side wall 20. Means are provided for rotating the disc 46, and comprise a vertically disposed shaft 48, the lower end of which is journaled in a suitable bearing assembly 49. The disc 46 and shaft 48 are driven by a link belt 50 which passes around the sprocket on the shaft 48 and around a similar sprocket 51 rigidly affixed to the upper end of the shaft 27 immediately beneath the hopper bottom 26.

The conduit 45 which receives rollers 52 as they are discharged from the hopper by centrifugal action, is made in sections with suitable collars 53 and 54 so that it may be readily removed in case of jamming or other trouble which interrupts the flow of rollers therethrough.

As shown in Figs. 10 and 11, the other end of the conduit 45 terminates at, and is supported by an upstanding bracket 55 which carries a plate 56 rigidly secured thereto by screws 57, a slot being provided at the end of the plate 56 adjacent to the terminating end of the conduit 45, so that rollers passing endwise through the conduit in end to end abutting relationship are projected across the slot and strike against a closed end wall to stop further axial movement of the roller.

Means are provided for engaging the rollers projected into the slot and forcing them downwardly in a substantially vertically disposed passageway and comprise a pair of depending fingers 58 and 59 which are rigidly secured to the ends of horizontally disposed rocker arms 60 and 61 respectively, which are journaled on a cross shaft 62. The shaft 62 is supported by an upstanding bracket 63, the lower end of which is rigidly mounted to the top plate 15 and the upper end of which is bifurcated to form spaced parallel arms 64 and 65, which receive the rocker arms therebetween, and in the upper ends of which the shaft 62 is supported.

The rocker arms 60 and 61 are adapted to have individual and independent movement from a single or common source of actuation and which is secured by a transversely disposed yoke member 66, which is pivoted medially of its ends on a pin 67, the ends of the yoke arms being bifurcated so as to be of uptanding U-shape to embrace horizontally disposed rigidly mounted pins 68 and 69 mounted in the ends of the rocker arms 60 and 61 respectively which are opposite to the ends having the fingers 58 and 59.

The yoke member 66 is pivoted to the upper end of a push rod 70, the lower end of which is threaded to receive a pair of nuts 71 and axially bored to receive the upper end of an axially disposed, downwardly projecting pin 72. The lower end of the pin 72 is slidably received in an axially disposed bore 73 of a push rod 74. The push rods 70 and 74 are normally held in spaced relation, as shown in Fig. 4 of the drawings, by a helical compression spring 76, the upper end of which surrounds the lower end of the push rod 70 and bears against the adjusting nut 71, and the lower end of which similarly surrounds the upper end of push rod 74 and bears against a nut 77 which is threaded on the top end thereof.

Axial movement is imparted to the two part push rod assembly in an upward direction by a cam 78 which is fixed to a horizontally journaled counter-shaft 79.

The push rod and rocker arms are normally yieldingly urged downward by helical tension springs 80 and 81, the upper end of which are attached to the pins 68 and 69, respectively, and the lower ends of which are anchored to horizontally disposed brackets 82 and 83 which are integrally formed on the bifurcated ends 64 and 65 respectively, of the supporting bracket 63.

The counter-shaft 79 is journaled at opposite ends in the lower ends of depending brackets 84 and 85, the upper ends of which are rigidly secured to the underside of the top plate 15. Rotation is imparted to the counter-shaft 79 by a belt 86 which passes around a pulley 87 fixed on the counter-shaft 36 and a similar pulley wheel fixed to the counter-shaft 79.

As the rollers are forced downwardly by the fingers 58 and 59 of the rocker arms, they are deflected by the sloping end surface 97 of a block 88 which is rigidly fastened to the bracket 55 by screw 89. The end of the block 88 having the sloping surface 97, is of substantially horizontal V-shape, as shown in Figs. 9 and 12, and the sloping surface 97 co-acts with one end 90 of a horizontally disposed slide plate member 91, which is normally urged toward the block 88 by a helical compression spring 92. One end of the spring 92 abuts against a fixed block 93 and the other end thereof bears against an upstanding stud 94 riveted to the top surface of the slide plate 91. A set screw 95 is threaded into a fixed block 96, for adjustably positioning the end 90 with respect to the sloping upper surface 97 of block 88, so as to provide a restricted passageway of slightly smaller size than the diameter of rollers 52, thus causing the slide plate 91 to be moved slightly against the action of spring 92 when the rollers 52 are forced down the passageway by the fingers 58 and 59. The blocks 93 and 96 are joined to each other by top plate 98 and rigidly secured by screws 99 and 100.

A horizontally disposed passageway which forms a magazine 101 is provided between the bottom surface of the slide plate 91 and the top surface of a block 102 which is rigidly secured to the upstanding bracket 55 by cap screws 103. The magazine 101 is substantially of the same depth as the maximum diameter of the rollers 52 so that the rollers are received therein in side by side relationship.

A yielding follower in the form of a pusher plate 104 has one end slidably received in the magazine 101, and the other end thereof secured to a cross-head 105 which is slidably journaled on a fixed rod 106. A helical compression spring 107 surrounds the outer end of the fixed rod 106 and bears between the cross head 105 and an adjustable nut 108 which is threaded on the end of the rod for varying the tension on the spring 107.

A vertically disposed slot 109 is provided in the block 102, the upper end of which communicates with the magazine 101 and the lower end of which discharges into a box or container 110 so as to take care of the overflow of rollers from the magazine when a certain predetermined number have been forced therein and thus caused the follower 104 to be pushed back against the action of the spring 107 until the top end of the slot 109 is uncovered.

Rollers are fed out of the magazine 101 by the follower 104 which pushes the rollers toward the block 88. The V-shaped end of the block 88 has its lower sloping surface 111 in spaced relation to a complementary surface 112 formed on the block 102 and the apex of the V-shaped end of the block 88 is positioned above the horizontal centerline of the magazine 101 so that when rollers in the magazine are pushed toward the block 88, they will have a tendency to feed downwardly into the slot 113 formed between the surfaces 111 and 112. The vertical edge of the block 102 adjacent the surface 112 is in spaced parallel relation to a complementary surface of the bracket 55 to form a vertically disposed slot 113, the lower end of which is in registry with a similar slot formed in a cylindrical bushing 114 which is rigidly mounted in the supporting bracket 55.

The bushing 114 is adapted to receive the enlarged shank 115 having a horizontally disposed mandrel 116 threaded thereinto, the outer surface of which is serrated and in concentrically spaced relation to the interior of the bushing, a distance substantially equal to the diameter of the rollers 52.

The shank or head 115 to which the mandrel 116 is attached in axial relationship, has a sliding bearing fit within the bushing 114 so as to hold the mandrel 116 centrally located within the bushing and permit rotative as well as axial movement therein.

The shank or head 115 is integrally formed on one end of a horizontally disposed shaft 117 which is slidably and rotatably journaled in upstanding spaced brackets 118 and 119 and in a similar bearing 120 located adjacent the opposite end thereof. Means are provided for rotating the shaft 117 and comprise a gear wheel 121 keyed to the shaft 117 between the brackets 118 and 119 so as to be rotatably fixed thereto but permit axial sliding movement of the shaft through the gear wheel.

The gear 121 meshes with a mutilated gear 122 which is of larger size and has sufficient number of teeth thereon to impart one complete rotation to the gear 121 and then permit a time period before again rotating it. The mutilated fear 122 is fixed on a horizontally disposed countershaft 123, which is journaled adjacent one end in the bracket 118 and at a point adjacent its other end in a bearing bracket 124. The countershaft 123, at the end thereof adjacent the bearing 124, is provided with a bevel gear 125 which meshes with and is driven by a similar bevel gear 126 rigidly fixed to a cross countershaft 127, which is journaled in bearings 128 and 129 located adjacent the opposite ends thereof. The shaft 127 is in the same horizontal plane as the shaft 117 and, as shown in Fig. 3 of the drawings, the end of the shaft 117 opposite to the shank head 115, is bifurcated and provided with a roller 130 journaled between the arms of the bifurcation and which is engaged by a cam 131 fixed on the shaft 127 for imparting axial movement to the shaft 117 at a time when the mutilated gear 122 is not in engagement with and rotating the gear 121.

Rotation is imparted to the shaft 127 by a link belt 132 which engages a pulley wheel 133 fixed on one end of the shaft 127 outward from the bearing 129. The belt 132 is driven by a pulley wheel 134 of a speed reduction unit 135. Power is imparted to the speed reduction unit 135 by an electric motor 136 which is connected thereto by shafts 137 and 138 and a flexible coupling 139 which interconnects adjacent ends of said shafts. The motor 136 is rigidly bolted to the shelf 17.

Snap switches 140 and 141 are mounted on the front plate 18 for controlling circuits to the electric motors 41 and 136 respectively.

Means are provided for stripping the rollers from around the mandrel 116 upon retraction of the shaft 117 from the position in which it is shown in Fig. 11 of the drawings, and comprise a pair of stripper plates 142 and 143 fixedly attached to rock shafts 144 and 145 respectively. The shafts 144 and 145 are interconnected by meshed gears 146 and 147 respectively so that rotation of one of the shafts will cause similar rotation of the other shaft but in the opposite direction.

The upper ends of the stripper plates 142 and 143 are cut out in semi-circular shape, as shown in 148 and 149 respectively, so as to snugly surround the mandrel 116 and engage behind the rollers which are disposed around the mandrel so that the rollers are stripped therefrom upon retraction of the mandrel from the position shown in Fig. 11.

As shown most clearly in Figs. 3 and 5, rocking movement of the shaft 145 is secured through the medium of a lever 150 which is rigidly affixed to said shaft and one end of which is engaged by a cam 151 fixed to the end of the shaft 123 which protrudes beyond the bearing 118. Contact is maintained between the long end of the lever 150 and cam 151 by a helical tension spring 152, one end of which is anchored to the top plate 15 and the other end of which is attached to the short arm 153 of the lever 150.

Means are provided for aiding the operator of the machine to hold a roller bearing member in position to receive the rollers from the mandrel 116, and comprises an upstanding bracket 154 rigidly mounted on the top plate 15 by cap screws 155. The upper end of the bracket 154 is provided with a frusto-spherical socket opening 156 of such contour as to snugly receive a bearing member 157 and hold the same in concentric registry with the mandrel 116.

The interior of the bearing member 157 is preferably provided with a coating of cup grease so as to retain the rollers 52 therein upon withdrawal of the mandrel 116. Such withdrawal of the mandrel is accomplished by a helical compression spring 158 which surrounds the shaft 117 and bears between the fixed bracket 119 and a collar 159 which is secured to the shaft 117, so as to normally maintain the roller 130 of shaft 117 in contact with the cam 131 at all times.

In the operation of this machine, a quantity of rollers 52 are placed in the hopper 19 and the cover plate 21 placed thereon. The motor 41 is then started which, through link belt 42, counter-shaft 36, belt 34 and shaft 27, will rotate the bottom 26 of the hopper and thus by centrifugal force align a series of rollers 52 about the side wall 20 of the hopper in the lower corner thereof at the junction of the side wall and rotating bottom 26. These aligned rollers are projected into the discharge conduit 45 by centrifugal force and the flow of rollers into the conduit is aided by the agitator comprising the cam finger 47 on disc 46, which is rotated through the link belt 50 from the shaft 27.

It is to be noted that the direction of rotation of the hopper bottom 26 and the disc 46 are the same so that the lug 47, as it passes into the hopper, moves in a direction opposite to the direction of movement of the rollers being fed into the discharge conduit so as to strike against the rollers and keep them back and otherwise agitate them.

As the rollers pass through the discharge conduit 45 they enter the passageway at the terminating end thereof and abut against the opposite wall of the passage. Movement of the rollers down the vertical slot and through the restricted opening formed by the sloping surface 97 of block 88 and the adjacent end 90 of the spring pressed plate 91 is accomplished by vertical movement of the fingers 58 and 59 which are attached to the rocker arms 60 and 61.

Movement is imparted to these rocker arms to cause reciprocation of the fingers by the push rods 70 and 74 which are normally held in spaced relation by the compression spring 76. Axial movement of the push rod assembly is caused by the cam 78 which is driven from the countershaft 36 through the belt 86. In the event one of the rollers should not be projected completely into the vertical slot or passageway from the discharge conduit 45, such roller will not be broken or bent by reason of the flexible drive through the compression spring 76 or if the roller is only partway across the passageway, the finger 58, which has a shorter contacting end than the finger 59, may move downwardly independently of the finger 59 by reason of the rocking yoke 66 which is pivoted to the top end of the push rod 70 and through which movement is imparted to the rocker arms 60 and 61 against the tension of springs 80 and 81.

As rollers 52 are fed downwardly through the restricted opening and into the magazine 101, they will at first continue their downward movement in the slot 113 until contact is made with the mandrel 116 which at that time is in the position shown in Fig. 10 of the drawings. Continued feeding of the rollers will cause the follower 104 to move to the left, as viewed in Figs. 9 and 12, until the follower 104 uncovers the overflow slot 109, at which time any further or additional rollers drop downwardly into the box 110.

At this time the motor 136 is started which, through the shafts 137 and 138, gear reduction unit 135, and belt 132, will cause rotation of the cross counter-shaft 127. Rotation of this shaft will in turn, through the medium of the beveled gears 125 and 126, cause rotation of the countershaft 123, which carries the mutilated gear 122. When the teeth on the gear 122 engage with the teeth on the gear 121, which is slidably keyed to the shaft 117, one complete rotation of the shaft 117 takes place, such rotation causing the rollers 52 to be carried around the mandrel 116 so as to completely fill the space between the mandrel and the interior of the cylindrical bushing 114.

The mechanism is so timed that at this point the shaft 117 is moved axially to the right from the position shown in Fig. 10 to the position shown in Fig. 11 by the cam 131 of shaft 127.

As the shaft 117 begins to move axially, the operator places the bearing member 157 in the socket 156 so as to be in position to receive the series of rollers which are grouped around the periphery of the mandrel 116. When the rollers have been projected into the member 157 by the mandrel, the relieved side of the cam 151 is in position to permit rocking movement of lever 150 which is caused by the tension spring 152, such rocking movement causing rotation of the shafts 144 and 145 in opposite directions by reason of the meshed gears 146 and 147 fixed to said shafts. Rotation of the shafts causes the upper ends of the stripper plates 142 and 143 to move inwardly and surround the mandrel immediately back of the rollers thereon and remain in this position until the compression spring 158 returns the shaft 117 to the position shown in Fig. 10 of the drawings, at which time the cam 151 actuates the lever 150 to restore the stripper plates to the position shown in full lines in Fig. 9.

The capacity of the vertical slot 113 and of the magazine 101 is such that a sufficient number of rollers are provided to quickly fill the space around the mandrel upon rotation thereof, the feeding of the rollers downwardly and around the mandrel being accelerated by the spring pressed follower 104.

The layer of cup grease around the inner periphery of the bearing member 157 retains the rollers 52 therein while the operator removes the bearing member from the socket 156 and during the time until the bearing is assembled on its trunnion.

Although but one specific embodiment of this invention has been herein shown and described, it will be understood that numerous details of the construction shown may be altered or omitted without departing from the spirit of this invention as defined by the following claims.

We claim:

1. In a roller bearing assembling machine, a rotatable and axially reciprocable mandrel, means for supplying rollers to the mandrel, means for rotating the mandrel to cause a plurality of rollers to encircle the same, means for moving the mandrel axially in one direction to move the rollers grouped therearound to a bearing member, stripper blades operatively associated with the mandrel, means for moving the blades toward the mandrel for engagement back of the rollers thereon and means for moving the mandrel axially in the opposite direction for stripping therefrom the rollers engaged by the blades.

2. In a roller bearing assembling machine, a rotatable and axially movable mandrel, a housing surrounding the mandrel in spaced relation thereto, means for supplying rollers to the space surrounding the mandrel, means for rotating the mandrel to cause rollers to be positioned therearound, means for moving the mandrel axially to transfer the positioned rollers from the space around the mandrel to a bearing member, means for returning the mandrel to its former position and means for positively stripping the rollers from the mandrel during such return movement.

3. In a roller bearing assembling machine, a rotatable and axially movable mandrel, a housing surrounding the mandrel in spaced relation thereto, means for supplying rollers to the space surrounding the mandrel, means for rotating the mandrel to cause rollers to be positioned therearound, means for moving the mandrel axially to transfer the positioned rollers from the space around the mandrel to a bearing member, stripper blades operatively associated with the mandrel, means for moving the blades toward the mandrel for engagement back of the rollers thereon, and means for moving the mandrel axially in the opposite direction for stripping therefrom the rollers engaged by the blades.

4. A roller bearing assembling machine, comprising an axially movable and rotatable mandrel, means surrounding the mandrel to provide a roller receiving space, means for supplying rollers to said mandrel and disposing them in said space, means for rotating the mandrel as the rollers are supplied so as to distribute them around the mandrel, power actuated means for axially moving the mandrel after said space is filled with rollers and moving the mandrel and rollers into a bearing disposed to receive them, means for subsequently reversing the axial movement of the mandrel, and means for holding the rollers in the bearing during return movement of the mandrel.

5. A roller bearing assembling machine, comprising an axially movable and rotatable mandrel, means surrounding the mandrel to provide a roller receiving space, means for supplying rollers to said mandrel and disposing them in said space, means for rotating the mandrel as the rollers are supplied so as to distribute them around the mandrel, power actuated means for axially moving the mandrel after said space is filled with rollers and moving the mandrel and rollers into a bearing disposed to receive them, means for subsequently reversing the axial movement of the mandrel, means for holding the rollers in the bearing during return movement of the mandrel, and means for interrupting rotary movement of the mandrel during axial movement thereof.

6. A roller bearing assembling machine, comprising an axially movable and rotatable mandrel, means surrounding the mandrel to provide a roller receiving space, means for supplying rollers to said mandrel and disposing them in said space, means for rotating the mandrel as the rollers are supplied so as to distribute them around the mandrel, power actuated means for axially moving the mandrel after said space is filled with rollers and moving the mandrel and rollers into a bearing disposed to receive them, means for subsequently reversing the axial movement of the mandrel, power actuated means for holding the rollers in the bearing during return movement of the mandrel, and means for rendering rotary movement of the mandrel, axial movement thereof, and the holding means operable in a definite order.

7. In a roller bearing assembling machine, a rotatable and axially slidable mandrel, means for supplying the rollers to the mandrel, a housing in spaced relation to the mandrel and providing a space for the rollers, means for rotating the mandrel to fill the space therearound with rollers, means for moving the mandrel axially to place the rollers in position on a bearing member, and means intermediate said bearing and said housing for stripping the rollers from the mandrel upon reverse movement of the latter.

8. In a roller bearing assembling machine having an axially slidable rotating mandrel disposed within a housing spaced concentrically relative thereto and against which roller bearings are conveniently assembled around the mandrel, in combination, means for axially projecting and retracting said mandrel relative to its position within said housing, and stripping means positioned exteriorly of said housing to prevent said rollers projected with said mandrel from returning with the mandrel when it is retracted.

9. In a roller bearing assembling machine, means for supplying rollers, duct means for receiving and conducting the rollers in side by side relation, means for assembling the rollers in bearing elements at one end of the duct means, means for automatically pushing rollers into the duct means as they are supplied by the first means, and means including a duct for accommodating excess rollers moved by the pushing means.

10. In a roller bearing assembling machine, means for supplying rollers, duct means for receiving and conducting the rollers in side by side relation, means for assembling the rollers in bearing elements at one end of the duct means, means for automatically pushing rollers into the duct means as they are supplied by the first means, means including a duct for accommodating excess rollers moved by the pushing means, and resilient means in the last mentioned duct for constantly urging the rollers therein towards the first duct.

11. In a roller bearing assembling machine, means for supplying rollers, a passageway for conducting the rollers in side by side relation, a pair of passageways arranged in V shape and at the apex communicating with the first passageway, means for pushing rollers into the first passageway, and spring pressed means in one of the angularly related passageways for permitting excess rollers to move into the passageway but normally causing the rollers moved by the pushing means to enter the other of the angularly related passageways.

12. In a roller bearing assembling machine, means for supplying rollers, means including a duct for receiving the rollers, in side by side relation, means including a second duct for receiving excess rollers removed from the first duct, means in the second duct for normally causing the rollers as supplied to enter the first duct, but allowing rollers to move into the second duct if movement of the rollers into the first duct is impeded.

13. In a roller bearing assembling machine, means for supplying rollers, means including a duct for receiving the rollers in side by side relation, means including a second duct for receiving excess rollers removed from the first duct, means in the second duct for normally causing the rollers as supplied to enter the first duct, but allowing rollers to move into the second duct if movement of the rollers into the first duct is impeded, and means communicating with the second duct for allowing a discharge of rollers therefrom in the event the number of rollers therein exceeds a predetermined amount.

14. In a roller bearing assembling machine, means including a duct for conducting rollers in side by side relation, a roller reservoir communicating with the duct and adapted to receive rollers in side by side relation, and means normally urging rollers in the reservoir towards the duct.

15. In a roller bearing assembling machine, means including a duct for conducting rollers, means for feeding and urging rollers through the duct, means providing an escape passageway communicating with the duct at the advance side of the feeding means, and means for causing rollers to move into the passageway in the event continued movement of rollers through the duct is impeded during operation of the feeding means.

16. In a roller bearing assembling machine, means including a duct for conducting rollers, means for feeding and urging rollers through the duct, means providing an escape passageway communicating with the duct at the advance side of the feeding means, means for causing rollers to move into the passageway in the event continued movement of rollers through the duct is impeded during operation of the feeding means, and means normally urging any rollers in the passageway to return to the duct.

17. In a roller bearing assembling machine, means including a duct for conducting rollers, means for feeding and urging rollers through the duct, means providing an escape passageway communicating with the duct at the advance side of the feeding means, means for causing rollers to move into the passageway in the event continued movement of rollers through the duct is impeded during operation of the feeding means, and means normally urging any rollers in the passageway to return to the duct, and to continue the movement of rollers through the duct in the event there is delay in the action of the feeding means.

FRANK KETCHAM.
GEORGE E. DUNN.